(12) United States Patent
Bondar et al.

(10) Patent No.: US 10,119,840 B2
(45) Date of Patent: Nov. 6, 2018

(54) MEASURING SYSTEM AND DRIVE SYSTEM

(71) Applicant: Micronas GmbH, Freiburg (DE)

(72) Inventors: Yan Bondar, Waldkirch (DE); Stefan Albrecht, Gundelfingen (DE)

(73) Assignee: TDK-Micronas GmbH, Freiburg (DE)

( * ) Notice: Subject to any disclaimer, the term of this patent is extended or adjusted under 35 U.S.C. 154(b) by 86 days.

(21) Appl. No.: 14/811,271

(22) Filed: Jul. 28, 2015

(65) Prior Publication Data

US 2016/0025521 A1    Jan. 28, 2016

(30) Foreign Application Priority Data

Jul. 28, 2014   (DE) ................ 10 2014 010 923

(51) Int. Cl.
  G01D 5/245   (2006.01)
  G01D 5/14   (2006.01)

(52) U.S. Cl.
  CPC ........... G01D 5/2451 (2013.01); G01D 5/147 (2013.01)

(58) Field of Classification Search
  CPC ........ G01D 5/147; G01D 5/2451; G01D 5/14; G01D 5/142; G01D 5/145; G01D 5/20; G01D 5/2006; G01D 5/202; G01D 5/2033; G01D 5/2013; G01P 3/44; G01P 3/488; G01P 3/487; G01P 3/49
  USPC ............ 324/207.15, 207.22, 207.23, 207.25, 324/207.26, 173, 174, 207.16, 207.2, 324/207.21
  See application file for complete search history.

(56) References Cited

U.S. PATENT DOCUMENTS

| | | | | |
|---|---|---|---|---|
| 4,924,674 | A * | 5/1990 | Hara | F01D 15/10 322/31 |
| 7,372,253 | B2 * | 5/2008 | Biber | F01D 21/003 324/174 |
| 7,696,746 | B2 * | 4/2010 | Shimomura | F02B 39/16 324/207.16 |
| 8,138,753 | B2 * | 3/2012 | Eberl | F01D 5/141 324/207.25 |
| 2005/0017709 | A1 | 1/2005 | Stolfus et al. | |
| 2005/0168091 | A1 * | 8/2005 | Miya | G01D 5/2013 310/168 |
| 2010/0213929 | A1 * | 8/2010 | Gregg | F01D 11/20 324/207.15 |
| 2011/0252789 | A1 * | 10/2011 | Kares | F01D 5/048 60/605.1 |
| 2014/0219836 | A1 * | 8/2014 | Houst | F04D 25/04 417/406 |

(Continued)

FOREIGN PATENT DOCUMENTS

DE   196 34 692 A1   3/1997
DE   196 23 236 A1   12/1997

*Primary Examiner* — Jeff Natalini
*Assistant Examiner* — Steven Yeninas
(74) *Attorney, Agent, or Firm* — Muncy, Geissler, Olds & Lowe, P.C.

(57) ABSTRACT

A measuring system and drive system with a measuring system, a magnet, a transmitter, and a magnetic field sensor. The magnetic field sensor is arranged between the magnet and the transmitter. The transmitter has a number of segments made of a magnetically conductive material, each segment having a wing shape with a web edge that is radially directed outwards, each web edge being diagonally designed towards the rotational direction, and that each web edge is distanced from the magnetic field sensor by an air gap.

17 Claims, 3 Drawing Sheets

(56) References Cited

U.S. PATENT DOCUMENTS

| | | | |
|---|---|---|---|
| 2015/0002143 A1* | 1/2015 | Nishimizu | G01B 7/16 324/207.25 |
| 2015/0233735 A1* | 8/2015 | Lerchenmueller | G01D 5/20 324/207.15 |
| 2015/0323346 A1* | 11/2015 | Maiterth | G01D 5/14 324/207.22 |

* cited by examiner

Rotation Direction $\varphi_1$ $\varphi_2$ $\varphi_3$ $\varphi_4$ $\varphi_5$

MEASURING SYSTEM AND DRIVE SYSTEM

This nonprovisional application claims priority under 35 U.S.C. § 119(a) to German Patent Application No. 10 2014 010 923.2, which was filed in Germany on Jul. 28, 2014, and which is herein incorporated by reference.

BACKGROUND OF THE INVENTION

Field of the Invention

The present invention relates to a measuring system and a drive system.

Description of the Background Art

For electronically commutated direct current motors, exact rotational angle information is required for activation.

SUMMARY OF THE INVENTION

It is therefore an object of the present invention to provide a measuring system for the measurement of a rotational angle, if possible.

In an embodiment, a measuring system is provided that includes a magnet and a transmitter and a magnetic field sensor. The magnetic field sensor can be arranged between the magnet and the transmitter. The transmitter can have a number of segments made of a magnetically conductive material. Each segment can have a wing shape with a web edge that is radially directed outwards. Each web edge can be designed diagonally towards the rotational direction. Each web edge can be distanced from the magnetic field sensor by an air gap.

In an actual execution, as explained with the diagrams, only a minimal moment of inertia is achieved through the design of the segments in a wing shape. In addition, an improved measurement resolution can be achieved through the sloped position of the web edge of the wing-shaped segments.

A further object of the invention is to provide an improved drive system. That can include an electrically commutated direct current motor and a measuring system. The measuring system can have a magnet and a transmitter and a magnetic field sensor. The magnetic field sensor can be arranged between the magnet and the transmitter. The transmitter can have a number of segments made of a magnetically conductive material. Each segment can have a wing shape with a web edge that is directed radially outwards. Each web edge can be designed diagonally towards the rotational direction. Each web edge can be distanced from the magnetic field sensor by an air gap. The transmitter can be designed torque-proof on a shaft of the electrically commutated direct current motor.

In an actual execution, as explained with the diagrams, the segments allow a high measurement resolution for the precise activation of the commutation.

The exemplary embodiments described relate to the measuring system as well as to the drive system.

According to an embodiment, the segment mass can be distributed rotationally symmetric. Advantageously, the transmitter is designed free of imbalance.

According to an embodiment, the segments can be arranged on a hub. The segments and hub can be designed in one piece from the magnetically conductive material. Further, the segments and hub can be designed from grey cast iron.

According to an embodiment, the radially outwards directed web edge of each segment can be spaced from a transmitter hub, for example by the length of one segment.

The magnetic field sensor can have at a minimum a first sensor element for the measurement of a magnet field component in one spatial direction, and a second sensor element for the measurement of a magnetic field component in a second spatial direction. The magnetic field sensor can have a first sensor element for the measurement of a magnetic field component in a first spatial direction, and a second sensor element for the measurement of a magnetic field component in a second spatial direction, and a third sensor element for the measurement of a magnetic field component in a third spatial direction.

The segments for the generation of air flow can be configured by a rotation of the transmitter.

In an exemplary embodiment, the drive system can have an electric circuit. The electric circuit is electrically connected with the magnetic field sensor and the coils of a stator of the electrically commutated direct current motor. The electric circuit can be arranged in a way that determines an absolute rotational position of the transmitter to be based on a measuring signal emitted by the magnetic field sensor within the width of a segment.

According to an embodiment, all segments can be of substantially or exactly the same form so that predominantly periodic measuring signals are generated from segment to segment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
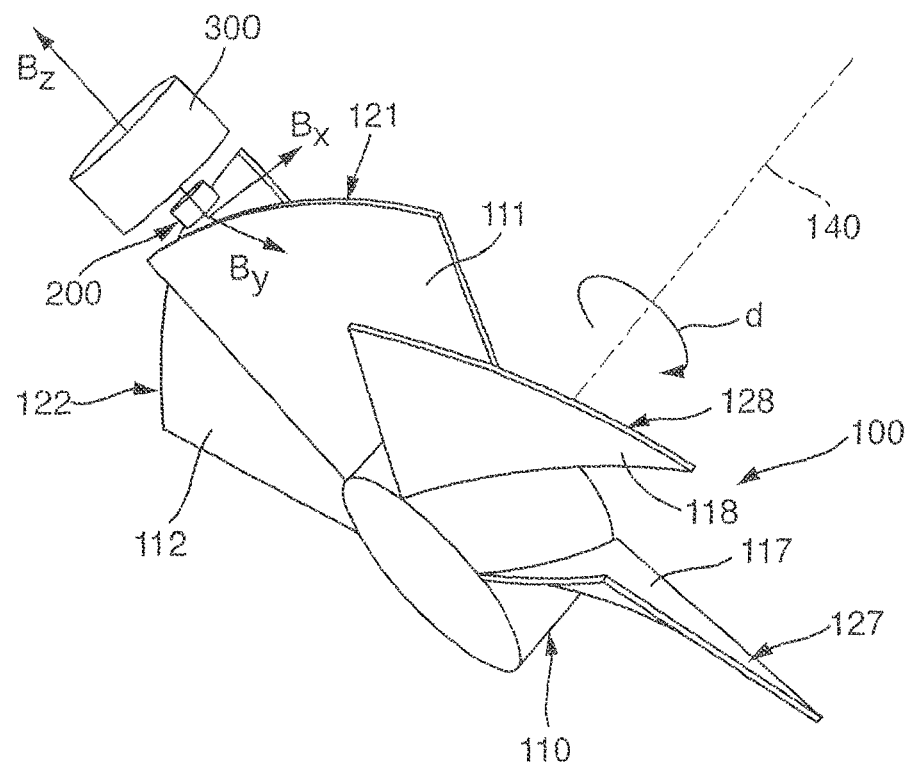
FIG. 1 shows a schematic illustration of a measuring system.

In FIG. 1, a measuring system with a magnet 300, a magnetic field sensor 200 and a transmitter 100 made of magnetically conductive material is illustrated in a three-dimensional view. It is noted that it is sufficient to design only the wings from a magnetically conductive material. Also shown is a rotational axis 140 of the transmitter 100 and a rotational direction d of the transmitter 100. In FIG. 1, the magnetic field sensor 200 is designed so that it measures the flux density components Bx, By, and Bz in three spatial directions which are arranged orthogonally to one another.

In FIG. 1, magnet 300 can be a permanent magnet, that can be made of, for example, SmCo217. The magnetic field sensor 200 is situated between the magnet 300 and the transmitter 100. Thereby, both the magnet 300 and the magnetic field sensor 200 are arranged fixed in position to one another. In contrast, the transmitter 100 is arranged in a movable position with respect to the magnet 300 and the magnetic field sensor 200, particularly rotatable around the rotational axis 140. The magnetic field of magnet 300 thereby permeates the magnetic field sensor 200 and is modulated by the transmitter 100. Such a magnet 300 is also termed a back bias magnet.

The transmitter 100 has a number of segments 111, 112, 117, 118 which can be formed at least partially from a magnetically conductive material. In FIG. 1, e.g., the transmitter 100 features seven segments, whereby only segments 111, 112, 117 and 118 are visible. Furthermore, the transmitter 100 can have any number of segments.

Each of the segments 111, 112, 117 and 118 in FIG. 1 feature a wing shape. The wing shape is thereby designed with a level plate or a small convex plate. Each of the segments 111, 112, 117 and 118 features a web edge 121, 122, 127, 128 that is mainly directed radially outwards. In the version of FIG. 1, each segment 111, 112, 117, 118, also feature two side edges mainly designed in an axial direction. Each segment 111, 112, 117, 118 is thereby designed diagonally towards rotational direction d. The sloped web edge 121, 122, 127, 128 is thus designed neither parallel to the axial direction nor parallel to the rotational direction.

Figure 2:
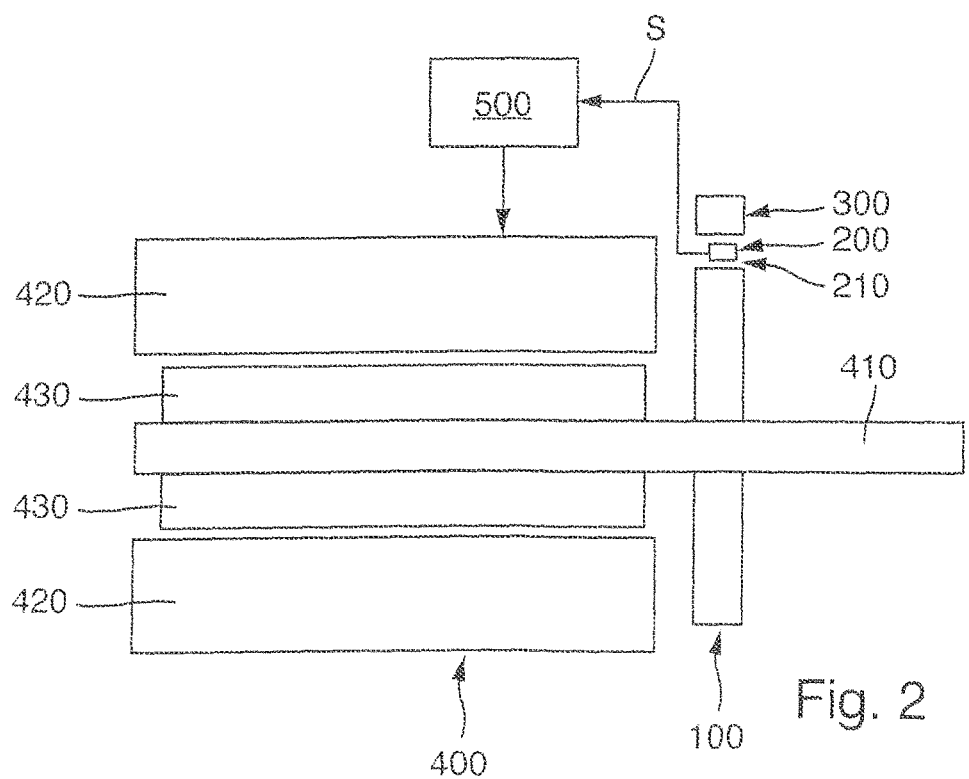
FIG. 2 shows a schematic illustration of a drive system.
Figure 4:
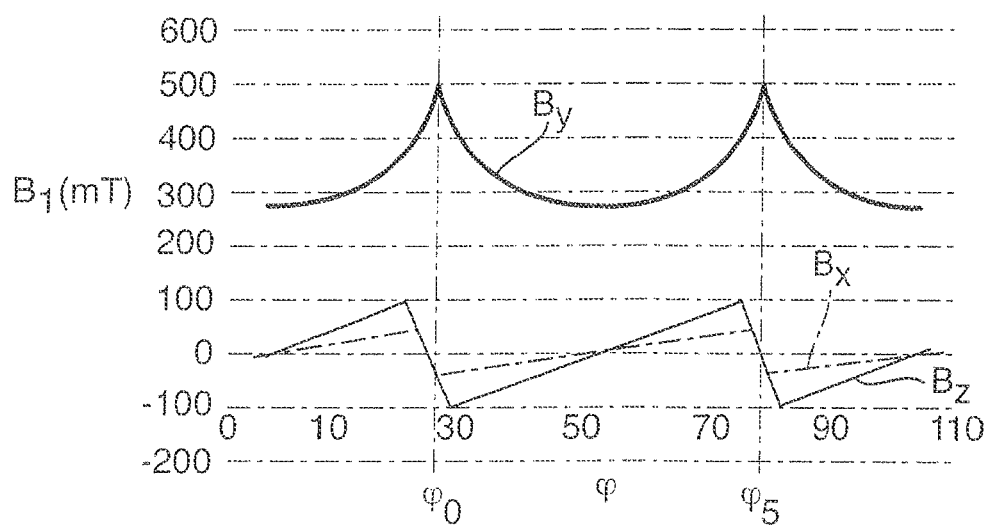
FIG. 4 shows a schematic diagram of a sensor signal.

Each segment 111, 112, 117, 118 is designed as a wing-shaped web. Under rotation, the diagonal position of segments 111, 112, 117, 118 delivers a fan blade effect. The sloped position of the web edges 121, 122, 127, 128 allows for a rotational angle φ in rotational direction d within a segment 111, 112, 117, 118 to be reliably measured by the analysis of the resulting magnetic field vector of magnetic field components Bx, By and Bz, as shown in FIGS. 2 and 4. Output signal S of magnetic field sensor 200 is a function of rotational angle φ. From segment 111 to segment 112, the rotational angle is ascertainable via incrementing (count value).

Web edge 121, 122, 127, 128 of each segment 111, 112, 117, 118 is—as illustrated in FIG. 2—designed to be distanced by an air gap 210 from magnetic field sensor 200. For each segment 111, 112, 117, 118, the air gap 210 may, for example, be a distance of 2 mm. In order to obtain a constant air gap 210, all sections of web edge 121, 122, 127, 128 can be designed at the same distance from rotational axis 140. In order to secure them to a shaft, segments 111, 112, 117, 118 are mechanically connected with a hub 110. Segments 111, 112, 117, 118 and hub 110 are designed in one piece from a magnetically conductive material. For example, the transmitter 100 is manufactured by a grey cast iron process.

A measuring system as shown in FIG. 1 provides several advantages. The measuring system offers a robust capturing of the absolute rotational position of the transmitter 100 also for industry and automobile applications affected by dirt, oil mist, etc. Magnet 300 and magnetic field sensor 200 are distanced far from the rotation center and orthogonally arranged towards the rotational axis 140. By virtue of the relatively large radius that is due to a great length L of segments 111, 112, 117, 118, a higher resolution is obtained in comparison with measuring systems which are arranged close to the rotation center. Due to the wing shape of segments 111, 112, 117, 118, despite the large radius a sufficiently small moment of inertia is obtained. Vibrations and measuring tolerance are reduced since no drive is required for the measurement value acquisition. In addition, segments 111, 112, 117, 118, can achieve a cooling of elements in synergy by means of convection, dependent on the rotational direction d.

The exemplary embodiment illustrated in FIG. 1 can generally be used for different rotations that are to be measured. By separating the segments 111, 112, 117, 118 in a peripheral direction, the measuring system is optimized particularly for the measurement of electric motor rotations. A drive system with a measurement system as per FIG. 1 is illustrated as a schematic view in the version of FIG. 2.

FIG. 2 illustrates an electrically commutated motor 400, for example a stepper motor or an electrically commutated direct current motor, also called a BLDC motor. The motor 400 in the version of FIG. 1 features a rotor 430 on a motor shaft 410. The rotor 430 rotates within the stator 420. The rotor 430 may feature permanent magnets. The stator 420 features coils. The coils of stator 420 are connected to a circuit 500. The circuit 500 is configured to control a coil current via the coils of the stator 420. The measurement of the rotational position via the measuring system is required so that the circuit 500 can control the coil current. FIG. 2 shows that the electric commutation is carried out particularly exact since the absolute rotational position is detected by a point of changeover to the commutation and the change of the absolute rotational position can be ascertained in a timely manner. The segments of the transmitter 100 are dedicated to motor pole pairs. The position of the segments in the circumference of the transmitter is mechanically adjusted to pole pairs of the motor 400 in order to enable an exact detection of the position of rotor 430 via measuring signal S through circuit 500.

Figure 3:
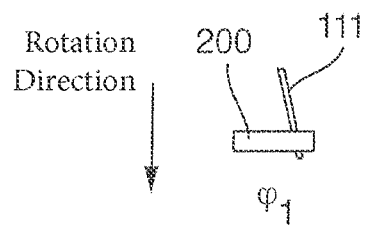
FIG. 3 shows a schematic view of different rotational angles.
Figure 3:
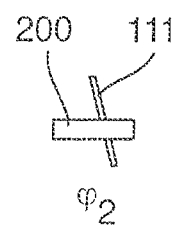
Figure 3:
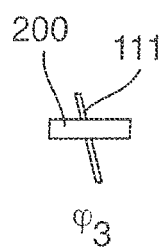
Figure 3:
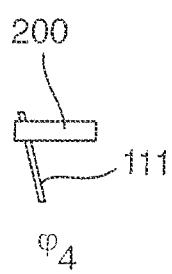
Figure 3:
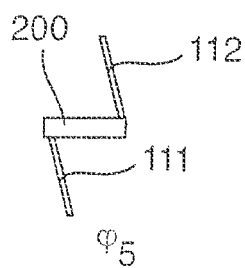

FIG. 3 shows a magnetic field sensor for two (2D) or three (3D) magnetic field components. The magnetic field sensor 200 is preloaded by a back bias magnet. FIG. 3 shows web edge 121 of segment 111 in a series of consecutive rotational positions φ1, φ2, φ3, φ4, φ5, relative to magnetic field sensor 200. The position of the web edge of segment 111 steadily changes within a passing of the segment by the magnetic field sensor 200.

Potential non-linear characteristics of the magnetic field sensor 200 or fluctuations in the field intensity versus the angle can at least partially be mechanically compensated for by the geometry of the segment 111, 112, 117, 118. Within the segment 111, 112, 117, 118, a maximum signal strength is utilized. In this way, a higher signal-to-noise ratio S/N is obtained as opposed to a system with a signal strength of more than 360°. Thus, a high total resolution is obtained for the measuring system, whereby the signal strength for each segment 111, 112, 117, 118 is individually available for the position resolution within the segment.

Accordingly, the commutation of the motor 400 in FIG. 4 can take place at an exact point in time. The transfer at angle φ5 denotes a changeover in the commutation. The transfer automatically and simultaneously generates a sync pulse which corresponds to the subsequent winding in the stator 420.

FIG. 4 illustrates a diagram of a measuring signal S with the magnetic flux density components Bx, By and Bz in three spatial directions subject to rotational angle φ. The rotational angle positions φ0 and φ5 thereby denote the changeover from one segment to the next segment. The circuit is configured in a way that it calculates the point in time of the winding of the stator 240 which is next in line in the commutation, using the succession of values of the magnetic flux density components Bx, By and Bz. The next winding is signaled by the succession.

The invention is not limited to the illustrated design variations of FIGS. 1 to 4. It is, for example, possible to design another wing-shaped form of the segments. It is also possible to design a larger or smaller number of segments, particularly tailored to the poles of the electric motor. The functionality of the drive system according to FIG. 2 can be particularly advantageous for high velocity applications or electrohydraulic applications. For example, the drive system is used in automobiles for the ABS-system or the brake booster or the power steering.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system comprising:
   a magnet;
   a transmitter rotating about an axis in a rotational direction;
   a magnetic field sensor arranged between the magnet and the transmitter, the transmitter having a plurality of segments made of a magnetically conductive material,
   at least two of the plurality of segments having a wing shape with a web edge, the segments extending radially outwards from a hub of the transmitter, each web edge being disposed at an end of each of the at least two segments opposite the hub, the segments being arranged on the hub diagonal to a rotational axis of the hub, and each web edge arranged at a distance from the magnetic field sensor by a first air gap,
   wherein each segment has two lateral edges substantially perpendicular to an outer surface of the hub and substantially perpendicular to the web edge, the two lateral edges being substantially perpendicular to wing faces of each segment and ending at the outer surface of the hub,
   wherein the magnetic field sensor detects each web edge of the transmitter, and
   wherein at least one passing segment of the segments is always directly between the hub and the magnetic field sensor, such that a plane intersects the hub, the web edge of the at least one passing segment, and the magnetic field sensor.

2. The measuring system according to claim 1, wherein mass of the segments is distributed in a rotationally symmetric manner about the hub.

3. The measuring system according to claim 1, wherein the segments and the hub are a single piece.

4. The measuring system according to claim 1, wherein the segments and the hub are made of grey cast iron.

5. The measuring system according to claim 1, wherein the magnetic field sensor has a first sensor element for measurement of a first magnetic field component in a first spatial direction, a second sensor element for measurement of a second magnetic field component in a second spatial direction, and a third sensor element for measurement of a third magnetic field component in a third spatial direction.

6. The measuring system according to claim 1, wherein the segments generate an air flow by a rotation of the transmitter.

7. A drive system comprising:
   an electrically commutated direct current motor; and
   a measuring system according to claim 1,
   wherein the transmitter is fixed on a shaft of the electrically commutated direct current motor.

8. The drive system according to claim 7, further comprising an electric circuit that is electrically connected to the magnetic field sensor and windings of a stator of the electrically commutated direct current motor, wherein the electric circuit is arranged such that the electric circuit determines an absolute rotational position of the transmitter based on a measuring signal emitted by the magnetic field sensor within a width of a single segment of the transmitter.

9. The measuring system according to claim 1, wherein the segments are arranged substantially symmetrical about a circumference of the hub.

10. The measuring system according to claim 1, wherein the segments move air.

11. The measuring system according to claim 1, wherein the magnet and the magnetic field sensor are disposed on a common axis perpendicular to the rotational axis of the hub, and
    wherein a second air gap is provided between the magnet and the magnetic field sensor.

12. The measuring system according to claim 1, wherein the two lateral edges of each segment are substantially equal and each segment is only supported by connection at the hub.

13. The measuring system according to claim 1, further comprising: a control circuit connected to electric coils of a stator, the stator driving the hub, the control circuit controlling current to the electric coils based on detection of each web edge of the transmitter.

14. A measuring system comprising:
    a magnet;
    a magnetic field sensor;
    a hub attached to a shaft of a motor;
    at least two blades extending from the hub towards the magnetic field sensor and the magnet, an outer edge of each of the at least two blades opposite the hub being a web edge, each blade being magnetically conductive,
    wherein the magnetic field sensor measures the interaction between the magnet and each web edge passing by the magnetic sensor,
    wherein each blade has two lateral edges substantially perpendicular to an outer surface of the hub and substantially perpendicular to the web edge, the two lateral edges being substantially perpendicular to wing faces of each blade and ending at the outer surface of the hub, and
    wherein at least one passing blade of the blades is always directly between the hub and the magnetic field sensor, such that a plane intersects the hub, the web edge of the at least one passing blade, and the magnetic field sensor.

15. The measuring system according to claim 14, wherein the blades are pitched on the hub relative to a rotational axis of the hub.

16. The measuring system according to claim 14, wherein the magnet and the magnetic field sensor are disposed on a common axis perpendicular to the rotational axis of the hub, and
    wherein an air gap is provided between the magnet and the magnetic field sensor.

17. The measuring system according to claim 14, wherein the two lateral edges of each segment are substantially equal and each segment is only supported by connection at the hub.

* * * * *